(12) United States Patent
Wang

(10) Patent No.: US 10,183,872 B2
(45) Date of Patent: Jan. 22, 2019

(54) COUNTER CIRCULATING LIQUID PROCESSING SYSTEM BY REPEATEDLY RE-USING THERMAL ENERGY

(71) Applicant: Qi Wang, Holland, PA (US)

(72) Inventor: Qi Wang, Holland, PA (US)

(73) Assignee: Qi Wang, Holland, PA (US)

( * ) Notice: Subject to any disclaimer, the term of this patent is extended or adjusted under 35 U.S.C. 154(b) by 277 days.

(21) Appl. No.: 15/181,260

(22) Filed: Jun. 13, 2016

(65) Prior Publication Data

US 2017/0355617 A1    Dec. 14, 2017

(51) Int. Cl.

| | |
|---|---|
| C02F 1/00 | (2006.01) |
| C02F 1/14 | (2006.01) |
| B01D 1/00 | (2006.01) |
| B01D 1/30 | (2006.01) |
| B01D 5/00 | (2006.01) |
| C02F 1/06 | (2006.01) |
| B01D 1/26 | (2006.01) |
| C02F 1/16 | (2006.01) |
| C02F 103/08 | (2006.01) |

(52) U.S. Cl.
CPC .............. *C02F 1/14* (2013.01); *B01D 1/0005* (2013.01); *B01D 1/0047* (2013.01); *B01D 1/0058* (2013.01); *B01D 1/0082* (2013.01); *B01D 1/26* (2013.01); *B01D 1/305* (2013.01); *B01D 5/006* (2013.01); *C02F 1/06* (2013.01); *C02F 1/16* (2013.01); *C02F 2103/08* (2013.01); *C02F 2201/008* (2013.01); *C02F 2209/02* (2013.01); *C02F 2209/03* (2013.01); *C02F 2209/40* (2013.01); *C02F 2301/08* (2013.01); *C02F 2303/04* (2013.01); *C02F 2303/10* (2013.01); *Y02W 10/37* (2015.05)

(58) Field of Classification Search
CPC ..................................... B01D 1/26; C02F 1/08
USPC ............ 202/174, 236, 235; 159/906; 203/10
See application file for complete search history.

(56) References Cited

U.S. PATENT DOCUMENTS

| | | | | |
|---|---|---|---|---|
| 4,475,988 A | * | 10/1984 | Tsumura .................. | B01D 1/26 202/174 |
| 6,391,162 B1 | * | 5/2002 | Kamiya .................... | C02F 1/14 203/11 |
| 6,607,639 B1 | * | 8/2003 | Longer ................ | B01D 1/0047 203/10 |
| 9,834,454 B2 | * | 12/2017 | Frolov ...................... | C02F 1/14 |

(Continued)

*Primary Examiner* — Nina Bhat

(57) ABSTRACT

A liquid desalination, distillation, disinfection, purification, or concentration system by repeatedly re-using thermal energy is provided. Thermal heat source can be solar, fossil fuel, or low grade heat discharged from industrial systems. Multiple thermally insulated and isolated stages of vaporization-condensation chambers can be connected to enhance production yield. Vapor is generated by direct heating of liquid and flash evaporation. Vapor generated is condensed in condenser cooled by intake liquid. Counter circulating intake liquid will be heated by released latent heat from vapor. Externally provided thermal energy will accumulate and be re-used in the system. Vaporization and condensation process will be continuously re-cycled to enhance production yield. The system can be configured to support flexible deployment in various configurations and in different locations, including direct floating installation on water surface.

17 Claims, 11 Drawing Sheets

(56) References Cited

U.S. PATENT DOCUMENTS

| | | | | |
|---|---|---|---|---|
| 2006/0272933 A1* | 12/2006 | Domen | ................ | B01D 1/0047 |
| | | | | 203/10 |
| 2015/0158740 A1* | 6/2015 | Hurtado | .................. | C02F 1/041 |
| | | | | 62/235.1 |
| 2015/0329378 A1* | 11/2015 | Polk, Jr. | ................. | B01D 3/146 |
| | | | | 203/11 |
| 2017/0275182 A1* | 9/2017 | Alshahrani | ................ | F24J 2/06 |

\* cited by examiner

COUNTER CIRCULATING LIQUID PROCESSING SYSTEM BY REPEATEDLY RE-USING THERMAL ENERGY

CROSS-REFERENCE TO RELATED APPLICATIONS

This application claims the benefit of provisional patent application Ser. No. 62/175,358, filed Jun. 14, 2015 by the present inventor.

FEDERALLY SPONSORED RESEARCH

Not Applicable

SEQUENCE LISTING

Not Applicable

BACKGROUND

Prior Art

Freshwater shortage worldwide has reached crisis level. There is urgent need to provide new freshwater supply worldwide, in addition to conservation effort. With increasingly depleted freshwater sources, the only potentially significant new freshwater source is desalination of seawater. Currently large scale commercially available desalination technology includes Reverse Osmosis (RO), Multi-Effect Distillation (MED), and Multi-Stage Flash Distillation (MSF). However, these desalination methods are expense and consume large amount of fossil fuel as energy source. Only resource-rich or developed nations can afford such technologies. With increasing concern of global climate change, technologies consuming large amount of non-renewable energy to generate freshwater is clearly not an environmentally sustainable long term solution. In addition, energy use efficiency of existing technologies converting saltwater into freshwater is less than ideal. They should and could be improved. Currently, there is no solution to provide new freshwater that can meet all of the long term requirements: environmentally sustainability, price competitiveness, large scale deployment, flexible installation, low cost construction and operation, etc.

Naturally using renewable solar energy to desalinate saltwater is an attractive and environmentally friendly approach. (Other renewable energy sources have not been proven to be adequate to desalinate saltwater on large scale.) Many solar desalination techniques capable of producing freshwater have been proposed. Of all proposed solar desalination technologies, thermal based desalination technology is the most promising. It is based on simple physical principle of using solar energy to heat and vaporize saltwater. Condensed water vapor will provide freshwater. However, solar desalination technology suffers from very low production yield, because of inherent low intensity solar energy. The cost to produce freshwater in turn is very expensive, especially when comparing with current freshwater supplies. Historically freshwater supply is often heavily subsidized by government. Its price typically is not reflection of true cost to produce freshwater. Hence any solar desalination techniques have to be price competitive to current freshwater supply, and can scale up to serve large population freshwater need, in addition to overcome any technical challenges.

Even with current commercially available MSF or MED based thermal desalination technologies using conventional fossil fuel or waste heat vapor from industrial plants, it is not using thermal energy to the fullest extent. Thermal energy re-use is quite limited. A substantial portion of thermal energy enters into the system is discarded. Production yield is limited.

Several other industries and applications use similar thermal distillation techniques and processes as in thermal desalination. They rely on the same physical principle. Original mixed liquid is thermally heated and vaporized. Evaporated vapor is then condensed into separate liquid. If mixed liquid and dissolved content have significant different boiling temperatures, they can be separated by this vaporization-condensation process. This is well-known distillation process to separate or concentrate liquid. This principle is widely used in chemical engineering, food processing, petroleum engineering, and pharmaceutical production to distill, disinfect, purify, or concentrate original liquid. Energy source to heat liquid can be fossil fuel, waste heat, or renewable energy sources like solar energy. Similar to thermal desalination, energy use efficiencies in these applications can be improved to increase production yield.

DEFINITION OF TERMINOLOGY

Important terminologies used in this disclosure are defined as in Table 1.

TABLE 1

Terminology and definition

| Terminology | Definition |
| --- | --- |
| Original Water | Water taken from ambience environment to be processed (desalinated, distilled, purified, concentrated, or treated for other purpose). It could be seawater, brackish water, agricultural run-off, storm run-off, industrial waste water, or any surface or sub-surface water, etc. to be processed. |
| Original Liquid | Liquid to be processed (distilled, disinfected, purified, or concentrated, or treated for other purpose). It could be liquid chemical compound mixture, petroleum, or any liquid mixture to be treated. |
| Brine Water | Water circulating in the system after being heated. It contains original mixture of liquid components at various concentration levels. |
| Discharged Brine Water | Brine water discharged from the system after being processed. It is more concentrated than brine water. |
| Freshwater | Water condensed from vapor generated through the system. |
| Water Vapor | Freshwater vapor generated from heating brine water. It is freshwater vapor that contains very low level of salt. Heating at sufficiently high temperature will also eliminate living contaminant such as bacteria. |
| Brine Liquid | Liquid circulating in the system after being heated. |
| Discharged Brine Liquid (also known as Concentrated Liquid) | Brine liquid discharged from the system after being processed. It is more concentrated than brine liquid. In liquid concentration applications brine liquid will continuously and repeatedly processed till it reaches certain concentrate level. It is then extracted from the system. |
| Concentrated Liquid | See Discharged Brine Liquid |
| Distilled Liquid | Liquid condensed from brine liquid vapor generated through the system. If boiling temperatures are sufficiently differentiated it can be of pure form for one type of liquid component in the original liquid mixture. |
| Distilled Vapor | Steam generated from heating brine liquid. Typically, it is highly selectively concentrated with liquid that has lower boiling temperature at the same pressure. |
| Waste Heat | By product of discharge low grade heat from industrial plants such as power generation plants or chemical processing plants. It is typically carried in the form |

TABLE 1-continued

Terminology and definition

| Terminology | Definition |
| --- | --- |
| | of water vapor. Alternatively, waste heat can be used to generate water vapor. |
| Concentrate Solar Panel (CSP) | Panel to concentrate low intensity solar energy. Its form can be parabolic trough or Fresnel Lens types. Typically, an evacuated tube is placed near its focal line. Heat transfer medium is circulated through the evacuated tube and heated to pre-determined temperature. Vapor can also be generated directly in the evacuated tube if heat transfer medium is the liquid to be processed itself. |
| Concentrated Solar Dish | Parabolic or spherical dish to concentrate low intensity solar energy. Typically, a vacuum evacuated disk is placed near its focal point. Heat transfer medium is circulated through the disk and heated to pre-determined temperature. Vapor can also be generated directly in the disk if heat transfer medium is the liquid to be processed itself. |
| Thermal Desalination | Production of freshwater by heating saltwater to produce freshwater vapor. Vapor is then condensed into freshwater. |
| Multi-stage Flash Distillation (MSF) | In multi-stage configuration each stage pressure and temperature are maintained at progressively lower level than the previous stage. Liquid entering this stage will rapidly evaporate (flash evaporation) into vapor in order to adjust to new thermal equilibrium within the new stage. |
| Multi-effect Distillation (MED) | In multi-stage configuration each stage pressure and temperature are maintained at progressively lower level than the previous stage. Distilled vapor and liquid from previous stage is used as heat source to heat and vaporize addition liquid. |
| Reverse Osmosis (RO) | High pressure is applied to a membrane that will block transfer of salt while allowing pass through of freshwater. |
| Low Grade Heat (Also known as "Waste Heat") | Also known as Waste Heat or Waste Vapor. In industrial applications such as power generating plants, some heat will be released into environment. Typically, it is carried away in vapor form and of low intensity. It still contains suffcient temperature and thermal energy to power distillation or concentration process. |

SUMMARY

The methods and apparatus are based on vaporization of original liquid to produce distilled liquid. If the boiling temperatures of the original liquid components are sufficiently different, liquid vapor generated will be distilled. It is then condensed to produce distilled liquid. In water processing applications, such as saltwater desalination, water boiling temperature is sufficiently high, it can also dis-infect the water undergoing processing. Alternatively, the original liquid can flow through the apparatus repeatedly until pre-determined concentration level is reached. The apparatus, methods, and operation principles are described in the following sections.

1. Physical Principles

Distillation is widely used in many applications and industries. It is based on a simple fact that for a mixed liquid, if different liquid components have different boiling temperatures, when mixed liquid is heated, the vaporization rates for different components will be different. If temperature is set at appropriate temperature, one liquid component will vaporize more rapidly than other liquid components in the original liquid. Vapor generated can then be separated and condensed into liquid to almost pure single liquid component.

1.1 Vaporization and Condensation Cycle:

In thermal desalination process, saltwater is heated to generate freshwater vapor. This is because freshwater and salt have vastly different boiling temperatures. A side benefit is boiling of saltwater will kill organic matters and in effect disinfect the water. Freshwater that produced through thermal desalination can be directly consumed. Using solar thermal desalination as an example, typically temperature difference between saltwater boiling temperature and ambient sea surface is greater than 70° C. Water vapor pressure ratio between these two temperatures can be 25~40 times. Once generated, water vapor can condense rapidly when exposed to such pressure and temperature difference. However, production yield by relying only on this principle typically is rather low because solar energy intensity at earth surface is low (~1000 W/m$^2$).

Another physical process can be employed to increase production rate is flash evaporation. For a given liquid mixture in a container, it will be at its thermal equilibrium, i.e. its temperature, pressure, and volume will be at certain level according to thermal dynamic laws. If one parameter is suddenly changed, the mixture will adjust itself to reach new thermal equilibrium state by releasing or absorbing thermal energy. When a liquid at higher temperature is introduced to a region at sufficiently lower pressure and temperature, this liquid is "superheated" in that region. It must release excessive thermal energy to reach new thermal equilibrium state in lower temperature region. Excessive heat is released by vaporizing liquid. Latent heat needed to vaporize liquid will carry away the excessive thermal energy and lower liquid's temperature. This process is called flash evaporation because this type of evaporation can happen rapidly. Multiple of vaporization and condensation stages can be connected together to form a system based on flash vaporization. It is estimated that as much as 13% of saltwater can be "flash" vaporized to generate freshwater vapor between boiling and ambient temperatures. This is in addition to direct vaporization of heating saltwater to boiling temperature.

If only above two physical processes are used to distill or concentrate liquid, production yield typically is still limited. That is why conventional MSF or MED uses large amount of energy to generate distilled liquid. In solar desalination, combined with inherent low intensity of solar energy at earth surface, freshwater production yield will be very low and impractical in commercial applications. This is the physical reason why so many proposed solar desalination techniques have not been able to generate sufficient large amount of freshwater at low cost.

Fortunately, a third physical process can be employed to significantly enhance the distilled liquid production yield. Two counter-flowing heat exchange processes can be designed to further enhance the energy use efficiency and production yield: counter-circulating multi-stage vaporization and multi-stage condensation. Cyclical flash vaporization and condensation can be repeatedly used to vaporize and condense original liquid, provided proper thermal loss is reduced to minimal and thermal isolation between stages is well maintained.

In this design, original liquid serves two purposes. On one flow path it is used to vaporize and generate distilled liquid vapor. External heat will directly vaporize original liquid. Flash vaporization through different stages will vaporize additional liquid. On counter-flowing opposite direction path, original liquid is also used as coolant to condense vapor to generate distilled liquid. When distilled vapor condenses it releases its latent heat to coolant (original liquid). The original liquid as coolant will absorb latent heat and its temperature will gradually rise as it is transported to different stages in the opposite direction. This process can be repeated indefinitely if there is no thermal loss, perfect thermal isolation between stages, and efficient thermal exchanges. In practical situation there will be thermal loss. But if such loss is well controlled and minimized, such repeat vaporization-condensation cycle can be prolonged. As more and more external thermal energy is added to the apparatus, even for low intensity solar energy, total thermal energy available to vaporization-condensation can be drastically increased, i.e. "amplified". Much higher yield of distilled liquid can then be produced.

In addition, speed of vaporization and condensation cycle can be significantly improved if high efficiency heat exchange devices are used in the apparatus. The amount of vapor generated or condensed depends on not only the amount of thermal energy available, but also thermal energy transfer rate. Faster heat exchange process will produce higher volume of distilled liquid. This will further enhance the production yield of distilled liquid.

This disclosure utilizes all of the above physical processes to present a highly productive apparatus and methods to generate distilled or concentrated liquid. Below sections describe in more details of the apparatus, methods, and operation. The apparatus has multiple stages. Its first stage is direct vaporization stage by using external heat transfer medium. Intermediate stages are used to flash vaporize additional liquid. The last stage is used to pre-heat intake original liquid. External thermal energy will continuously enter into the apparatus and accumulate. Total available thermal energy to vaporize will increase until external thermal energy and thermal loss from the apparatus reaches equilibrium.

1.2 Multi-Stage Vaporization:
1) Direct Heating and Vaporization Stage: Solar, fossil fuel, or industrial waste heat is used to directly heat and vaporize original liquid in the first stage. Heating can be provided by heat transfer medium flow through heat exchanger in the first direct heating stage, or by vapor, or by liquid produced externally using renewable energy, industrial waste heat, or conventional heat source.
2) Flash Vaporization Stages: Middle section of intermediate stages rely on flash vaporization to produce additional distilled vapor. At each stage saturation pressure and temperature are maintained at progressively lower level. Therefore, heated original liquid (brine liquid) from previous stage will be flash vaporized when it enters the next lower pressure and temperature stage. Such flash vaporization will produce additional distilled vapor-in addition to direct vaporization occurring in the first directing heating stage.
3) High thermal efficiency vaporization device can be employed to speed up heat exchange process during vaporization.

1.3 Multi-Stage Condensation:
1) In each stage vapor will condense on the condenser that is maintained at lower temperature, cooled by intake liquid flowing through it.
2) Liquid condensed is then extracted away to heat brine liquid in next stage.
3) High efficiency condenser and surface treatment can be employed to increase heat exchange between vapor and condenser. Different techniques include: (a) Increase condenser heat exchange surface area; (b) Design different geometric configuration of heat exchanger; (c) Apply hydrophobic coating to exchanger exterior surface; (d) Use higher thermal conductivity materials to construct thermal exchanger.

1.4 Counter Circulating Heat Exchange:
1) Original liquid (from condenser) enters the first stage is heated to boiling temperature to generate vapor. As it enters next stages it will continuously be flash vaporized. Its temperature will be gradually lowered. Thermal energy is transferred to the coolant in condensers.
2) Circulating in opposite direction, coolant used in condenser is the same intake liquid. As it enters a stage, because its temperature is at lower level, it will act as coolant to condense higher temperature vapor in that particular stage. As it moves into next stage, it will absorb thermal energy released by condensed vapor. And its temperature will gradually increase.

1.5 Accumulation of Thermal Energy:
1) If thermal loss to the environment is reduced to minimal, and there is good thermal isolation between stages to maintain different thermal equilibrium states, heat exchange between these two processes can continue for prolonged time period. In an idea situation this vaporization-condensation cycle can continue indefinitely. Thermal insulation and isolation can be accomplished by the combination of: a) using low thermal conductivity materials for stage exterior wall; b) adding thermal shield to the exterior wall and other components (pipelines, valves, regulators, and pumps) of the stage; c) applying surface coating to increase heat absorption from the environment, d) enclosing the stage in a vacuum chamber to reduce convective heat loss to the environment; e) adding active heating to the exterior of the stage to reduce temperature difference between stage exterior wall and the environment.

2. System Architecture and Operation

The overall system architecture, apparatus, and operation is described in the following sections.

2.1 Multi-Stage System:

The system is designed to have multiple stages (FIG. 7 or FIG. 8). The first stage (FIG. 1 and FIG. 2) is direct vaporization stage. External thermal energy is used to heat brine liquid and generate vapor directly. External thermal energy can be transferred into this stage either indirectly using heating media, or it can be vapor produced externally. In the first stage, lower temperature intake liquid in condenser will condense the liquid vapor. Once it's heated up to near boiling temperature, it will be released into this stage. It will then be further heated by external heat and generate vapor. Remaining heated brine liquid, at boiling temperature in this stage, will be transferred to next stage for further flash vaporization.

The last stage of the system is the pre-heating stage (FIG. 5 or FIG. 6). Brine liquid (to be discharged) and distilled liquid will flow through this stage at two separate heat exchangers. Intake liquid at ambient temperature enters this stage in opposite direction. Thermal energy remaining in brine liquid and distilled liquid will be transferred to the intake liquid flowing in opposite direction. Brine liquid and distilled liquid temperature will be lowered to near ambient temperature and then released or extracted away for consumption. Intake liquid will absorb thermal energy from the brine liquid and distilled liquid. Its temperature will gradually increase. In effect thermal energy is exchanged between brine liquid and distilled liquid to intake liquid. Minimal thermal energy will be lost. Released liquid (brine liquid and distilled) will be at temperature near ambient temperature.

Between the first and last stages, multiple intermediate stages (FIG. 3 and FIG. 4) are implemented. In these stages, intake liquid will act as coolant in condenser, because its temperature is lower than the stage temperature as it enters the stage. When it leaves the stage, however, it will absorb thermal energy released by the condensed distilled liquid. Its temperature will rise to near stage temperature. Brine liquid and condensed distilled liquid from previous stage will be at higher temperature when just enter this stage. Brine liquid is "superheated" in this stage and it will "flash" evaporate to generate vapor. Condensed distilled liquid is used to heat brine liquid in this stage to generate additional vapor. During the process, condensed distilled liquid will release its excess thermal energy. Its temperature will be lowered to the stage temperature.

2.2 Thermally Shielded and Isolated System:

The system must be thermally shielded to reduce heat loss to the environment. Low thermal conductivity materials can be used in construction of the system. Elements exposed to the environment should be thermally shielded to reduce thermal energy loss. Between stages they should also be thermally shielded to provide thermal isolation. Active heating, by absorbing solar energy or conventional directly controlled heating, can be used to reduce temperature difference between the stage and environment, and therefore reduce thermal loss.

2.3 Dynamically Controlled Operation:

Each stage is dynamically controlled at pre-determined different pressure and temperature. First stage is at highest pressure and temperature. In the second and later stages, temperatures and pressures are progressively lowered to provide pre-determined temperature and pressure differences between stages. At each stage thermal equilibrium temperature and pressure are determined by thermal dynamics.

2.4 Continuous Filtration:

Each stage contains additional filtration to reduce dissolved mineral content. In the last pre-heater stage, original liquid at ambient temperature is first filtered to remove organic and dissolved mineral content. It is then transferred through condenser to provide cooling to condense vapor. In between each stage, addition filtration is added to further remove dissolved mineral content. Original liquid can also be pre-treated chemically and mechanically.

3. Applications

In one embodiment, but not limited to, a solar thermal desalination system can be designed to directly generate freshwater vapor from saltwater, and condense the freshwater vapor into freshwater cooled by ambient saltwater. This system can also be used for saltwater desalination, water purification, and water disinfection near large body of surface water, such as ocean, sea, lake, reservoir, river, etc.

In addition, this method can be applied broadly to any kind of liquid that needs distillation, disinfection, and purification of any water such as brackish water, agricultural runoff, storm runoff water, industrial waste water, or municipal waste water. If it is solar based, it can operate off-grid in remote or less developed areas worldwide. With minor re-configuration, it can also be used to distill, disinfect, purify, or concentrate liquid in other industries such as in chemical engineering, food processing, petroleum engineering, and pharmaceutical production.

3.1 Solar Saltwater Desalination System:

Using solar desalination as an illustrative example, freshwater vapor can be generated from saltwater with Concentrated Solar Panel (CSP). It can include two modes of operation: 1) Direct vapor generation and 2) Indirect vapor generation. In direct vapor generation, saltwater is pumped through thermally evacuated tube directly. Solar energy heat and vaporize saltwater. Pressure and temperature inside evacuated tube is controlled by adjusting the pressure and saltwater flow rate through the tube. In indirect vapor generation, heat transfer medium is heated by CSP solar energy. Heat transfer fluid carries solar energy to each stage to heat up and vaporize saltwater. FIG. 9 or FIG. 10 demonstrate different embodiments of using CSP to desalinate saltwater.

As brine water moves to the next stage it will be heated up by absorbing released latent heat from condensed freshwater vapor. To-be-discharged brine saltwater and condensed freshwater will go through heat exchangers containing intake liquid. Its temperature will be lowered to near ambient temperature and then released. In such counter-circulating heat exchange process, thermal energy will be re-cycled through the system continuously. Minimal thermal energy will be lost to the environment. As more and more thermal energy enters the system, it will be accumulated and intensified. More thermal energy will be available to vaporize and produce freshwater. In effect low intensity or low grade thermal energy such as solar energy or waste energy can be "amplified" to produce larger quantity freshwater.

3.2 Solar Saltwater Desalination Deployment:

Deployment of solar desalination system can be on land near water source, float directly on water surface, or semi-permanently fixed structure near coast. Each CSP and vapor generator/condenser assembly can be connected to form a distributed network. Each unit will operate independent from each. Such distributed system provides additional robustness and reliability. Networked system can be supported on a rigid structure. For water surface installation, the networked system will be floated by flotation devices around the supporting structure to provide buoyancy. For direct installation on seabed, the system will be secured on supporting structure. At opposite corner, a motor powered propeller are connected to the assemble. It is used to control the orientation of each networked assembly to track sun position throughout the day in a floating installation. Angle of CSP is also dynamically adjusted to maximize incident solar energy.

In order to decrease turbulent effect of surface water waves. At the perimeter of the installation, protective buffers are used to reduce wave intensity. As wave pass through such buffers, its energy will be absorbed and reduced by the buffers.

This system can be cascaded into multiple stage water purification system. Previous stage purified water can be sent into next stage water intake pump to provide additional distillation and purification.

Because freshwater is condensed boiling water vapor, if pipelines/condenser/storage tanks are properly sanitized and maintained, purified water can be directly consumed. Portion of the thermal energy can be used to heat freshwater to provide heated freshwater for direct consumption.

ADVANTAGES

This disclosure presents a viable solution to generate freshwater at high volume to meet large scale, low cost desalination need. It can also be generalized into broader applications and industries. Thermal energy is used and re-used repeatedly to generate vapor and condense vapor into distilled (or concentrated) liquid. It can in effect "amplify" low intensity energy source such as solar energy or waste heat to significantly increase production yield. It can also be used in broader applications in other industries to improve liquid processing production yield. Applications can benefit from this technology include liquid distillation, disinfection, purification, and concentration in chemical engineering, food processing, petroleum engineering, and pharmaceutical production, etc. Thermal energy source used to generate distilled or concentrated liquid can be solar, fossil fuel, or waste heat from industrial plants. Summaries of some of the key advantages are listed in the following:

1) Counter-circulating vapor generation and condensation to continuously re-use thermal energy to increase production yield.
2) Dynamic pressure and temperature controlled vapor generation and condensation to maximize yield.
3) Highly efficient heat exchange devices to further enhance production yield.
4) Thermally shielded and isolated steam generation and condensation component to reduce heat loss, and to maintain optimal thermal equilibrium state in each stage.

5) Distributed networked system for increased reliability and robustness.
6) Multi-stage high temperature filtration for dissolved minerals and other organic or particular materials.
7) Direct floating installation at water surface.
8) Propelled solar tracking for floating installation.
9) Perimeter wave reduction devices to reduce water wave turbulence to the system.

DETAILED DESCRIPTION OF THE DRAWINGS

Figure 1:
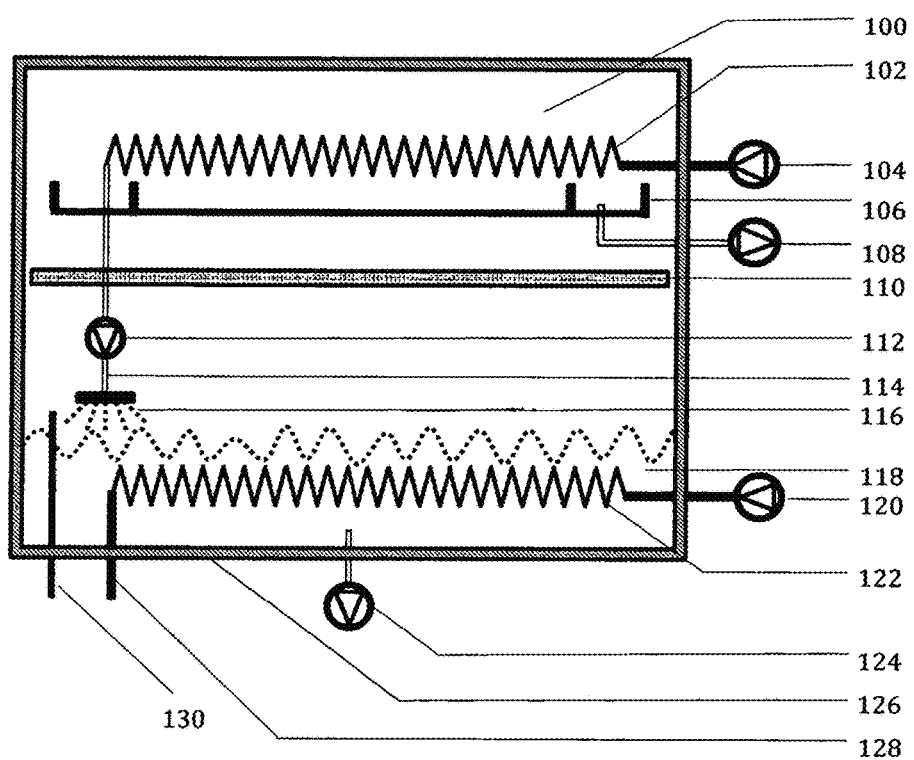
FIG. 1 illustrates the side view of one embodiment for the first stage of the apparatus. Pressure and temperature controls are not shown for clarity purpose.

FIG. 1 illustrates the side view of one embodiment of the first stage in the distillation embodiment. In desalination embodiment intake original liquid will be saltwater. The heating medium can be heat transfer medium heated by external heat source, or can be vapor directly.

External thermal energy (from solar or other heat sources) is pumped in to heat and vaporize brine liquid. Brine liquid is already near boiling temperature when it is released from condenser into this stage, because it has circulated through condensers in other stages as coolant. Vapor generated will condense to form distilled liquid. Distilled liquid and remaining brine liquid will be pumped into next stage to heat and vaporize additional brine liquid. Demister is used to filter brine liquid droplets formed during vaporization.

TABLE 2

Side-view of the first vaporization stage numerals and parts

| Numeral | Description | Notes |
|---|---|---|
| 100 | Vaporization chamber | |
| 102 | Vapor condenser. | Condenser is cooled by the intake liquid. Intake liquid has been used as coolant in condensers and heated by previous stages. At discharge point (116) its temperature will be near boiling temperature. |
| 104 | Condenser coolant pump and pipeline. | Pipeline is connected to the output of pervious stage's condenser coolant output. |
| 106 | Distilled liquid collection pan. | In desalination embodiment distilled liquid will be freshwater. |
| 108 | Distilled liquid extraction pipeline and pump. | It is pumped to next stage as heat source to heat brine liquid (324). |
| 110 | Demister. | Used to filter liquid droplets that may form when vaporizing original liquid. |
| 112 | Pump to distribute heated intake brine liquid from condenser output. | Brine liquid is near boiling temperature at this point. |
| 114 | Pipeline to transport heated intake brine liquid from condenser to distribution nozzle. | |
| 116 | Nozzle to distribute intake brine liquid for vaporization. | Brine liquid is near its boiling temperature. It is then further heated and vaporized by external heating medium circulating in vaporization device (122). |
| 118 | Boiling brine liquid. | Its temperature is at boiling temperature for this stage equilibrium state. |
| 120 | Pump and pipeline to supply externally heated heat transfer medium. | Medium can be heat transfer medium or vapor directly. |
| 122 | Vaporization device to heat and vaporize brine liquid in first stage. | |
| 124 | Pipeline and pumps to transfer brine liquid to the next intermediate stage. | Brine liquid temperature is at its thermal equilibrium boiling temperature at this stage. It will be "superheated" for the next intermediate stage since next intermediate stage's thermal equilibrium temperature will be lower. |
| 126 | Stage wall and insulating layer. | Insulation can be either passive insulation or active insulation (heated by external heat source such as solar energy or conventional heat source.) |
| 128 | Heat transfer medium return pipeline. | Heat transfer medium will return to Concentrated Solar Panel to be re-heated. |
| 130 | Pipeline and regulator to extract non-condensable gas and to regulate stage pressure. | It will enter next stage to provide additional heating. At meantime vapor will condense into distilled liquid to be extracted. Pressure regulator will dynamically adjust the stage's pressure to pre-determined level. |

Figure 2:
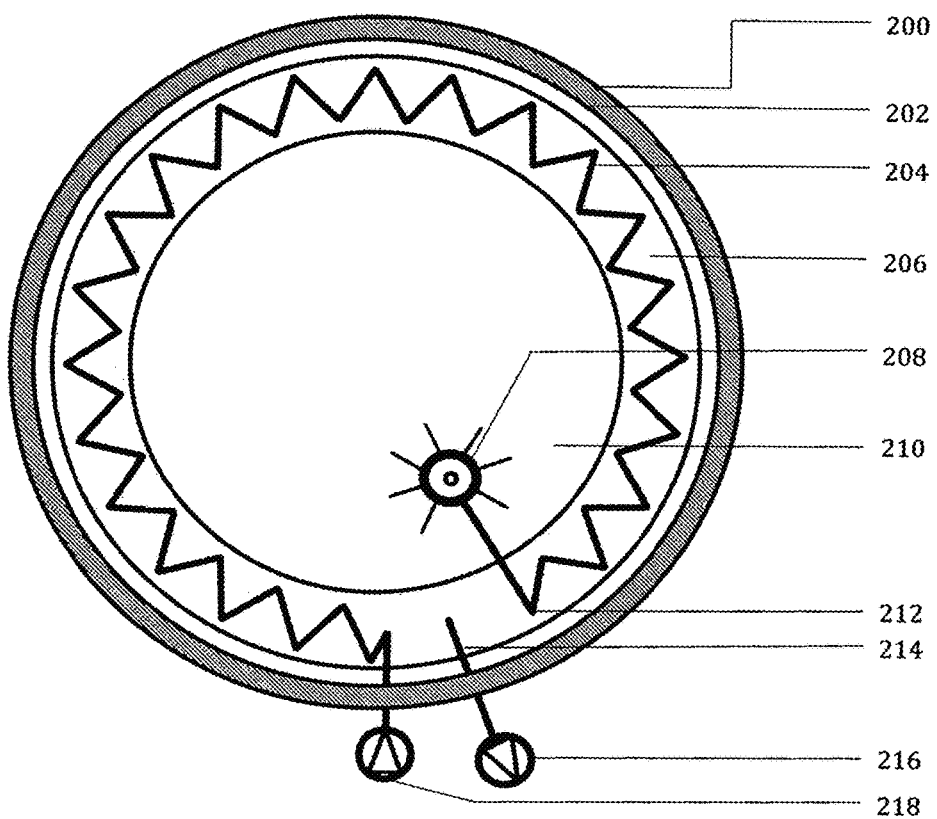
FIG. 2 illustrates the top view of the same embodiment as in FIG. 1 for the first stage of the apparatus. For clarity purpose the bottom portion of the stage (heat exchanger to vaporize brine liquid) non-condensable gas and vapor extraction and regulation, and demister are not shown. They can be inferred from side view in FIG. 1. Pressure and temperature controls are not shown.

FIG. 2 illustrates the top view of one embodiment for the first stage. For clarity purpose, bottom half of the chamber (heat exchanger to vaporize brine liquid, and associated pipelines and pumps) is omitted. They have similar structure as the top half and can be inferred from side view illustration.

TABLE 3

Top-view of the first vaporization stage numerals and parts

| Numeral | Description | Notes |
|---|---|---|
| 200 | Insulated low thermal conductivity chamber for the first stage. | Insulation can be either passive insulation or active insulation (Heated by external heat source such as solar energy or conventional heat source.) |
| 202 | Apparatus wall. | |
| 204 | Condenser. | It is cooled by intake brine liquid. |
| 206 | Distilled liquid collection pan. | |
| 208 | Nozzle and pipeline to distribute brine liquid for vaporization. | Brine liquid is already near its boiling temperature. It is then further heated and vaporized by external heating medium circulating in vaporization heat exchanger (122). |
| 210 | Apparatus chamber. | |
| 212 | Condenser output. | Intake liquid at near boiling temperature is introduced to the first stage to be further heated and vaporized. It has been used as coolant in previous stages' condensers and in the first stage as. Its temperature has been rising progressively to near boiling temperature near the output point of the first stage condenser. |
| 214 | Pipeline to extract distilled liquid from collection pan. | In desalination embodiment, distilled liquid is freshwater. |
| 216 | Pump to extract distilled liquid. | |
| 218 | Pump and pipeline to transport intake liquid as coolant for the condenser to the first stage condenser. | Coolant (intake liquid) is already heated by circulating through previous stage condensers as coolant. |

Figure 3:
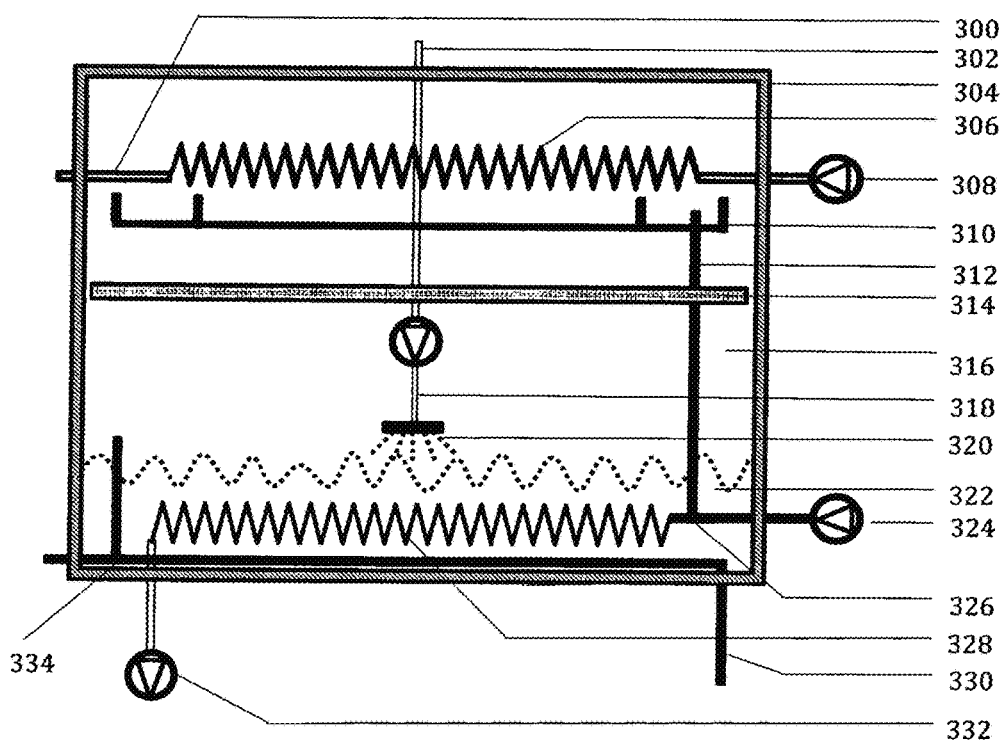
FIG. 3 illustrates the side view of one embodiment for intermediate stages. Pressure and temperature controls are not shown for clarity purpose.

FIG. 3 illustrates the side view of one embodiment for the intermediate stage in the distillation embodiment. In desalination embodiment intake original liquid will be saltwater. At each of the intermediate stage, equilibrium temperature and pressure of that stage are set at pre-determined, progressively lower level than the temperature and pressure at previous stage. Brine liquid from previous stage will become "superheated" upon entering this stage. It will immediately flash vaporize into distilled vapor in order to maintain proper thermal equilibrium at this stage.

Distilled liquid collected from previous stage will also enter this stage and is used as heating medium to heat brine liquid. Distilled liquid temperature will decrease to reach thermal equilibrium temperature at this stage. In addition, as pipeline containing non-condensable gas, vapor, and distilled liquid flow through intermediate and final stage, it will provide additional heating to brine liquid in each stage.

TABLE 4

Side-view of intermediate stage numerals and parts

| Numeral | Description | Notes |
|---|---|---|
| 300 | Output of condenser coolant (intake liquid) into next stage condenser. | Coolant temperature at this stage is lower than the temperature at next stage. Hence it can be served as coolant to condense liquid vapor. |
| 302 | Brine liquid input from previous stage. It is pumped and distributed into this stage (318 & 320). | Input brine liquid is "superheated" when entering this stage because previous stage thermal equilibrium temperature is higher. |
| 304 | Intermediate stage walls and insulating layer. | Insulation can be either passive insulation or active insulation (Heated by external heat source such as solar energy or conventional heat source.) |
| 306 | Condenser. | It is cooled by intake liquid. |
| 308 | Pipeline and pump to transport intake liquid (coolant) through condenser. | |
| 310 | Distilled liquid collection pan. | |
| 312 | Distilled liquid transport pipeline to merge into main distilled liquid pipeline. | In desalination embodiment distilled liquid will be freshwater. |
| 314 | Demister to filter out brine droplets may form during vaporization. | |
| 316 | Intermediate stage chamber. | |
| 318 | Pipeline, pump, and spray nozzle to distribute brine liquid from previous | "Superheated" liquid will quickly vaporize ("flash vaporize") when |

TABLE 4-continued

Side-view of intermediate stage numerals and parts

| Numeral | Description | Notes |
|---|---|---|
| | stage. | entering a lower pressure and temperature region. |
| 320 | Spray nozzle to "flash" vaporize part of brine liquid. | "Superheated" liquid will quickly vaporize ("flash vaporize") when entering a lower pressure and temperature region. |
| 322 | Brine liquid. | It is at boiling point for this stage's pressure and temperature. It is being further heated by the distilled liquid transported from previous stage. Distilled liquid from previous stage is at higher temperature than brine liquid at this stage. Hence it can further vaporize some of the brine liquid in this stage. |
| 324 | Main pipeline and pump to combine and transport collected distilled liquid. | Distilled liquid temperature will gradually be lowered as it circulates through each intermediate stage to heat brine liquid and release its thermal energy to vaporize brine liquid. |
| 326 | Combiner to combine distilled liquid generated in this stage and from previous stage. | |
| 328 | Heat exchanger to heat and vaporize brine liquid. | Distilled liquid from previous stage is at higher temperature than the equilibrium temperature at this stage. Therefore, it can be used to further heat and vaporize brine liquid. |
| 330 | Pipeline and regulator to transport non-condensable gas, vapor, and distilled liquid to next stage. | It will enter next stage to provide additional heating. At meantime vapor will condense into distilled liquid to be extracted. Pressure regulator will dynamically adjust the stage's pressure to pre-determined level. |
| 332 | Pipeline and pump to transport distilled liquid to next stage. | |
| 334 | Combiner, pipeline, and stage gas/vapor intake line. | Intake pipeline takes in current stage non-condensable gas and vapor. They are combined in combiner with previous stage's non-condensable gas, distilled liquid, and vapor. |

Figure 4:
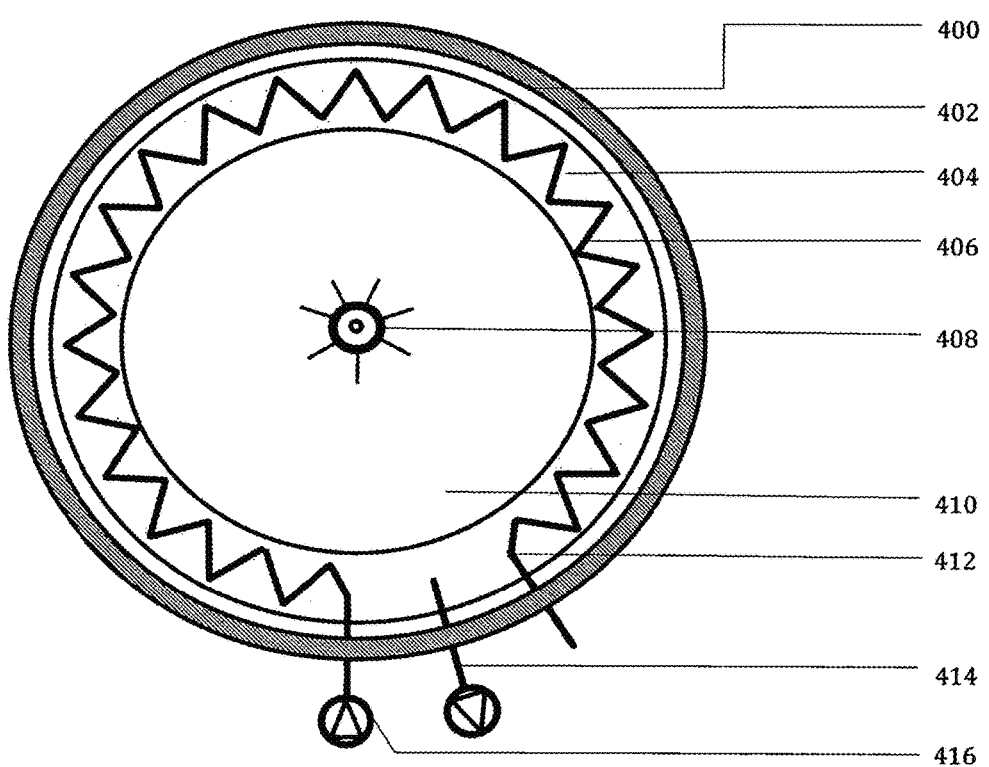
FIG. 4 illustrates the side view of the same embodiment as in FIG. 3 for the intermediate stages. For clarity purpose the bottom portion of the stage and demister are not shown. They can be inferred from side view in FIG. 3. Pressure and temperature controls are not shown.

FIG. 4 illustrates the top view of one embodiment for the intermediate stage. For clarity purpose, bottom half of the chamber (distilled liquid heat exchanger, demister, pipelines, and pumps) is omitted. They have similar structure as the top half and can be inferred from the side view illustration.

TABLE 5

Top-view of intermediate stage numerals and parts

| Numeral | Description | Notes |
|---|---|---|
| 400 | Apparatus wall | |
| 402 | Apparatus insulation layer. | Insulation can be either passive insulation or active insulation (Heated by external heat source such as solar energy or conventional heat source.) |
| 404 | Distilled liquid collection pan. | |
| 406 | Condenser. | |
| 408 | Pipeline and pump to transport and distribute brine liquid from previous stage to this stage. | |
| 410 | Apparatus chamber. | |
| 412 | Output of condenser coolant (intake liquid) to next stage condenser. | Coolant is the intake liquid from previous stage condenser. At output its temperature will be at thermal equilibrium boiling temperature for this stage. |
| 414 | Main condenser pipeline and pump to collect and transport distilled liquid. | When distilled liquid leaving this stage its temperature will be at equilibrium temperature of this stage. |

TABLE 5-continued

Top-view of intermediate stage numerals and parts

| Numeral | Description | Notes |
|---------|-------------|-------|
| 416 | Pipeline and pump to transport condenser coolant (intake liquid). | Entering intake liquid will have lower temperature than the equilibrium temperature at this stage. |

Figure 5:
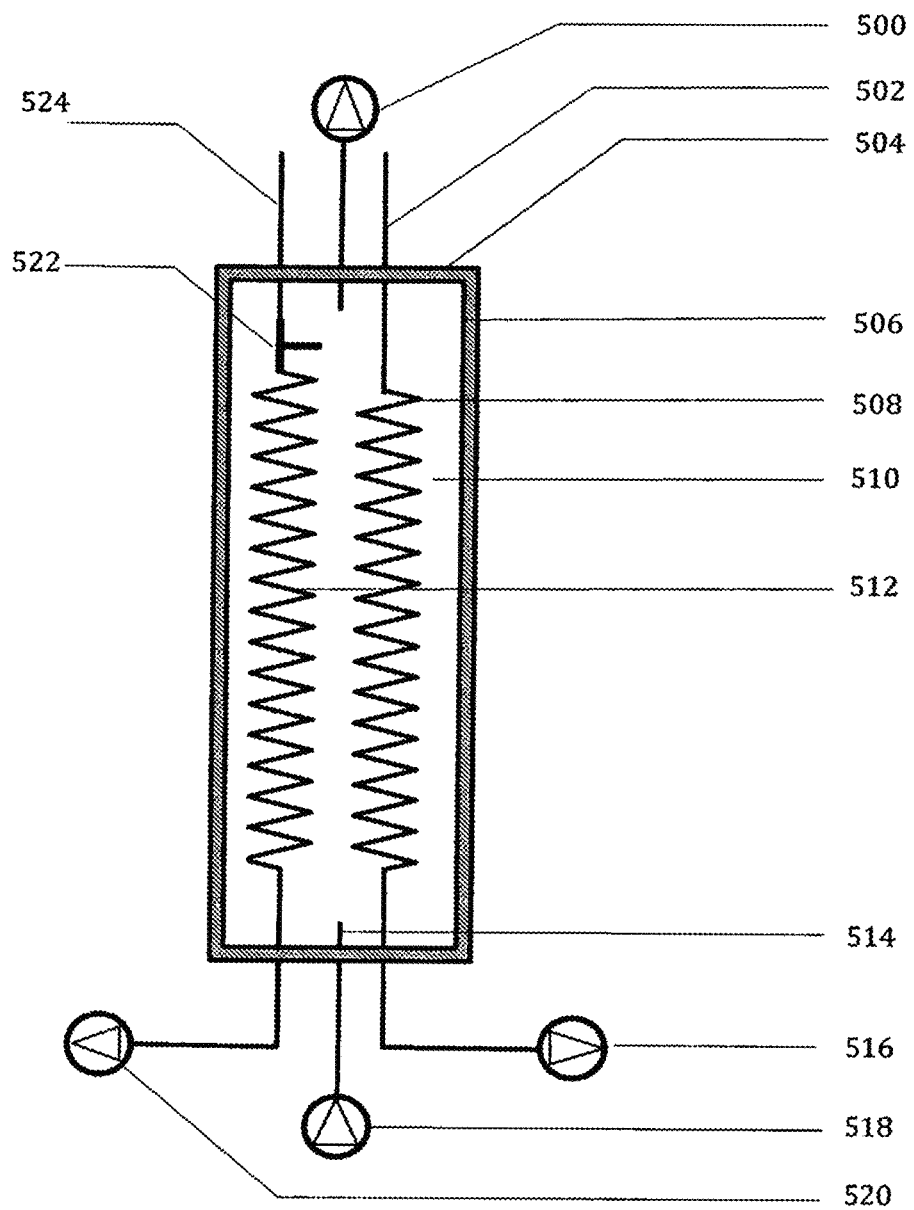
FIG. 5 illustrates one embodiment for the last stage, pre-heater stage, in a distillation or desalination configuration. Pressure and temperature controls are not shown for clarity purpose.

FIG. 5 illustrates the side view of one embodiment for the last stage (pre-heater stage) in distillation embodiment. In desalination embodiment intake original liquid will be saltwater and distilled liquid will be freshwater.

Intake original liquid is pumped to this stage from the environment or external storage at ambient temperature. Discharged brine liquid and distilled liquid are pumped through this stage in opposite direction in heat exchangers. Remaining heat from discharged brine liquid and condensed distilled liquid are transferred to intake original liquid. Discharged liquid and condensed liquid will be pumped away at near ambient temperature. At this stage essentially all remaining thermal energy above ambient thermal energy level in distilled and discharged brine liquid is recovered.

Pipeline and pump transporting non-condensable gas will also flow through this stage.

For clarity purpose it is not shown in the drawing. Distilled liquid from previous stage extracted through this path is combined with other distilled liquid before entering the last pre-heater stage. It is also not shown for clarity purpose.

Figure 6:
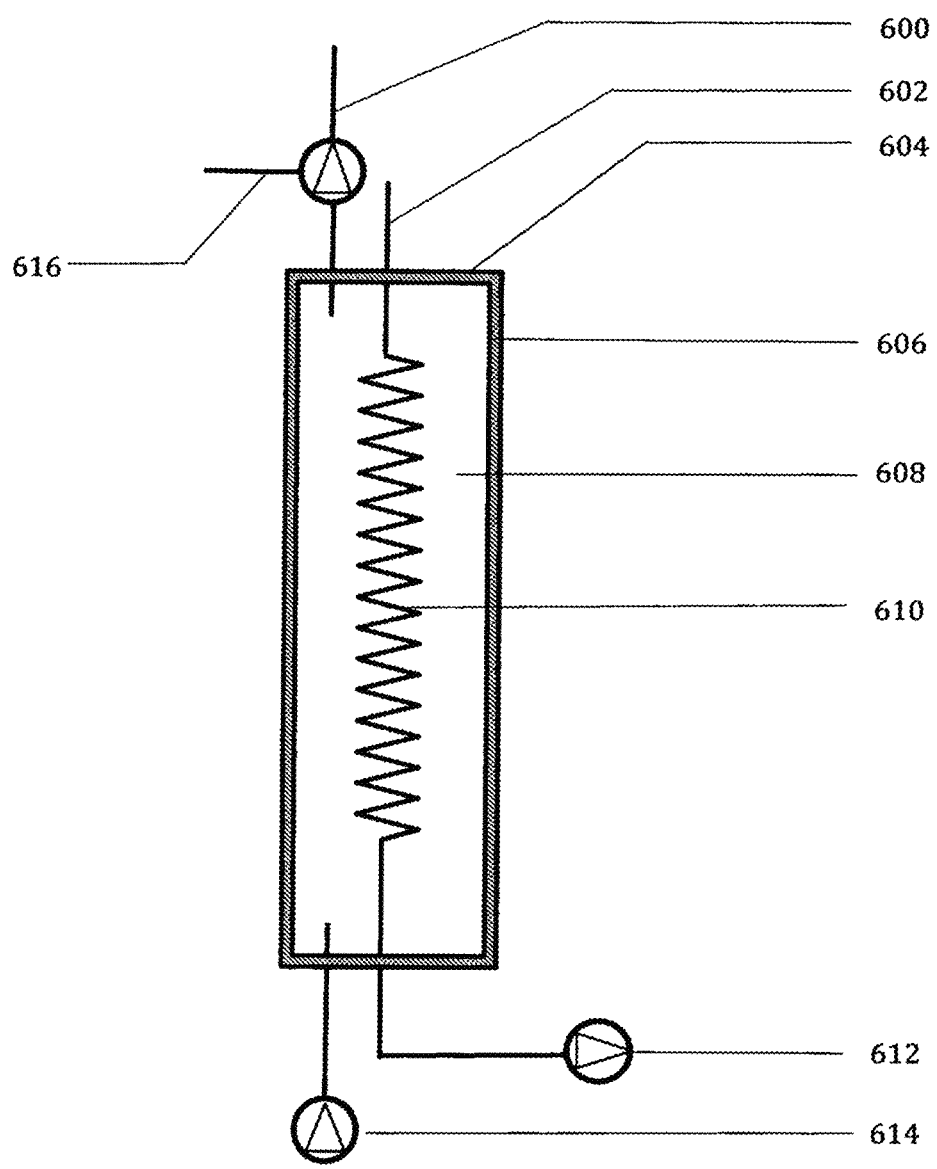
FIG. 6 illustrates another embodiment for the last stage, pre-heater stage, in a concentration configuration. Pressure and temperature controls are not shown for clarity purpose.

FIG. 6 illustrates the side-view for the last stage (pre-heater stage) in concentration embodiment.

Intake original liquid is pumped to this stage from the environment or external storage at ambient temperature. Distilled liquid is pumped through this stage in opposite direction in heat exchanger. Remaining heat from condensed distilled liquid is transferred to intake original liquid. Condensed distilled liquid will be pumped away at near ambient temperature. Brine liquid will be re-circulated back into condenser as coolant. Brine liquid may also be mixed with intake liquid to be introduced into condenser as coolant. Once pre-determined concentration level is reached, brine liquid will be pumped away. At this stage essentially all remaining thermal energy above ambient thermal energy level in distilled is recovered.

Pipeline and pump transporting non-condensable gas will also flow through this stage. For clarity purpose it is not shown in the drawing. Distilled liquid from previous stage extracted through this path is combined with other distilled liquid before entering the last pre-heater stage. It is also not shown for clarity purpose.

TABLE 6

Side-view of the last stage (pre-heater) numerals and parts descriptions

| Numeral | Description | Notes |
|---------|-------------|-------|
| 500 | Pump and pipeline to extract heated intake original liquid, | Intake liquid has absorbed heat from distilled and brine liquid. Its temperature has risen from ambient temperature. |
| 502 | Pipeline to transfer distilled liquid from previous intermediate stage to the last pre-heater stage, | In desalination configuration distilled liquid will be freshwater and original liquid will be saltwater. |
| 504 | Thermal insulating layer. | Insulation can be either passive insulation or active insulation (Heated by external heat source such as solar energy or conventional heat source.) |
| 506 | Pre-heater last stage wall. | |
| 508 | Heat exchanger containing distilled liquid. | |
| 510 | Pre-heater (last stage) heat exchange chamber holding intake original liquid, | Colder intake liquid will be near the bottom while warmed up intake liquid will rise to the top of the chamber. |
| 512 | Heat exchanger containing distilled liquid. | |
| 514 | Pipeline to introduce intake original liquid into pre-heater stage. | |
| 516 | Pump and pipeline to transport distilled liquid. | |
| 518 | Pipeline and pump for intake liquid. | |
| 520 | Pump and pipeline for discharged brine liquid, | Discharged brine liquid temperature will be near ambient temperature. |
| 522 | Re-mixer to mix brine liquid with intake liquid. | At pre-determined level part of the brine liquid can be re-introduced into intake liquid circulation flow. |
| 524 | Pipeline to transport to be discharged brine liquid from previous intermediate stage. | |

TABLE 7

Side-view of the last (pre-heater) stage numerals and parts descriptions in liquid concentration embodiment

| Numeral | Description | Notes |
|---|---|---|
| 600 | Pump and pipeline to transport heated intake original liquid from pre-heater. It can also combine brine liquid with intake liquid back to condenser (616). | Brine liquid and intake liquid mixing ratio can be pre-determined. |
| 602 | Pipeline to transfer distilled liquid from previous intermediate stage to the last, pre-heater stage. | |
| 604 | Thermal insulating layer. | Insulation can be either passive insulation or active insulation (Heated by external heat source such as solar energy or conventional heat source.) |
| 606 | Last, pre-heater stage wall. | |
| 608 | Pre-heater chamber holding intake original liquid, | Colder intake liquid will be near the bottom while warmed up intake liquid will rise to the top of the chamber. |
| 610 | Heat exchanger. | Distilled liquid in the exchanger will transfer its thermal energy to intake original liquid. Its temperature will be lowered to near ambient temperature near exit. |
| 612 | Pipeline and pump to transport distilled liquid. | |
| 614 | Pipeline and pump to transport intake original liquid. | Intake original liquid is at ambient temperature. |
| 616 | Pipeline to transport brine liquid from intermediate stage back into mixing with intake liquid (600). | Brine liquid and intake liquid ratio can vary according to pre-determined ratio. |

Figure 7:
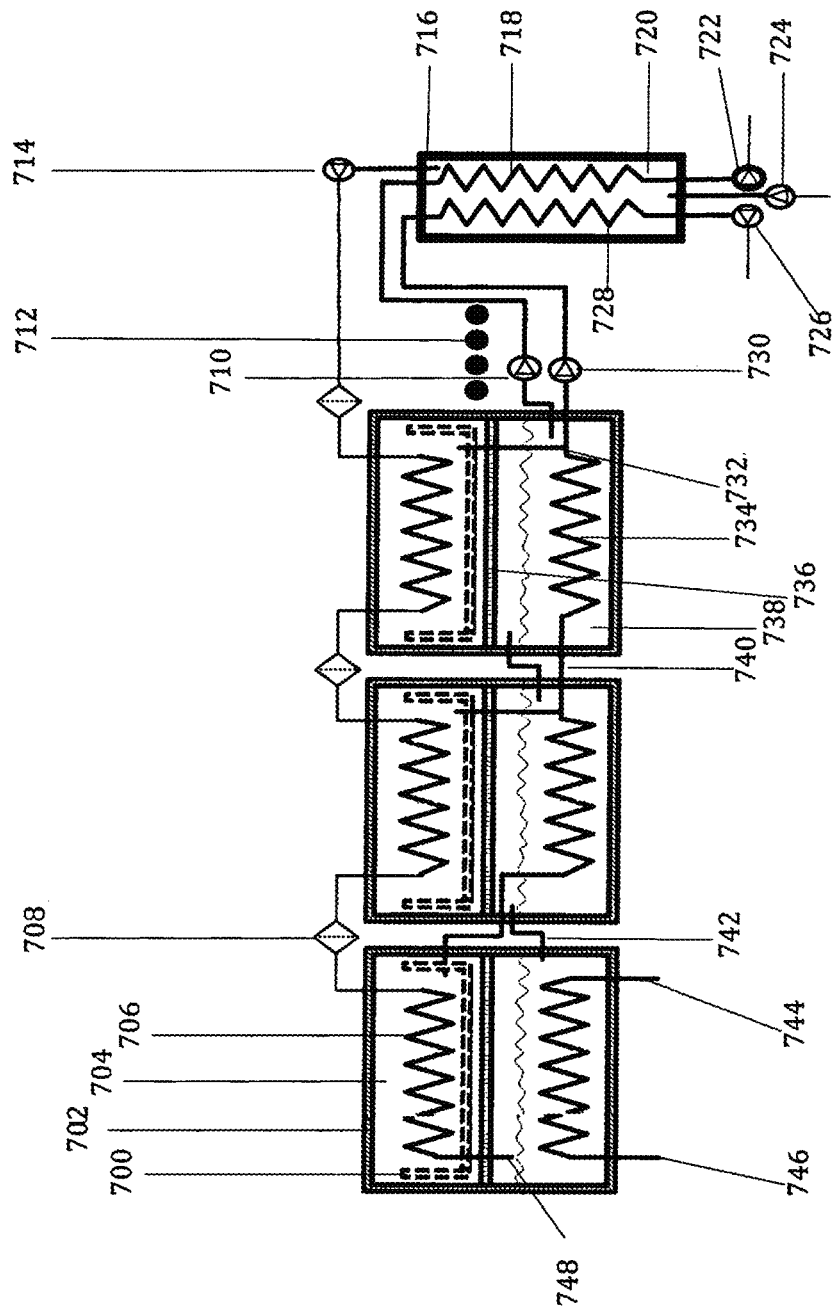
FIG. 7 illustrates one embodiment of the apparatus in a horizontally connected multi-stage configuration. Pressure and temperature controls are not shown for clarity purpose.

FIG. 7 illustrates multiple stage horizontally connected embodiment. Different stages can be connected physically together or connected through insulated pipelines and pumps. Temperature and pressure controller for each stage are not shown for clarity purpose.

Intake liquid will be pumped into the last (pre-heater) stage. It will be filtered for organic, particular, and dissolved contents through a series of filtration devices. Intake liquid will enter into condenser circulation as coolant. As it moves through different stages it will absorb latent heat released by condensing vapor. At the first stage condenser output, its temperature will be close to boiling temperature and released into first stage. Once the liquid enters into first stage, it will be heated and vaporized partially by thermal energy provided by external sources such as solar, conventional fossil heat, or waste heat.

Distilled liquid will be pumped into next stages as heat source. As it moves through different stages and release its thermal energy, its temperature will gradually drop. At the last stage, most remaining thermal energy in distilled liquid will be transferred to intake liquid. Distilled liquid will be pumped away at near ambient temperature.

Brine liquid, as it moves into the next stage, will be partially flash evaporated. Its thermal energy will be gradually transferred to coolant in condenser (i.e. intake liquid). Its temperature will be progressively lowered. At the last stage, remaining thermal energy above ambient thermal energy level will be mostly transferred to intake liquid. It will be released at near ambient temperature.

TABLE 8

Multi-stage connected embodiment numerals and parts descriptions

| Numeral | Description | Notes |
|---|---|---|
| 700 | Distilled liquid collection pan. | |
| 702 | Stage walls and thermal insulating layer for each stage. | Insulation can be either passive insulation or active insulation (Heated by external heat source such as solar energy or conventional heat source.) |
| 704 | Stage chamber. | Thermal equilibrium temperature and pressure at each stage are controlled at pre-determined. progressively lowered levels. Temperature and pressure controller for each stage are not shown for clarity purpose. |
| 706 | Condensers. | Condenser coolant (intake liquid) will absorb latent heat released by vapor as it condenses vapor at different stages. Its temperature will progressively rise. |
| 708 | Filtration devices. | |

TABLE 8-continued

Multi-stage connected embodiment numerals and parts descriptions

| Numeral | Description | Notes |
|---|---|---|
| 710 | Pump and pipeline to extract brine liquid from the last intermediate stage to the last, pre-heater stage. | |
| 712 | Additional intermediate stages can be added according to different pre-determined operating parameters. | |
| 714 | Pump and pipeline for intake liquid. | Intake liquid circulates through condensers as each stage as coolant to condense distilled vapor. Between stages it will undergo further filtration (708). |
| 716 | Last (pre-heater) stage wall and insulating layer. | Insulation can be either passive insulation or active insulation (Heated by external heat source such as solar energy or conventional heat source.) |
| 718 | Heat exchanger containing to-be-discharged brine liquid. | |
| 720 | Last, pre-heater stage chamber holding intake liquid. | Colder intake liquid will be near the bottom while warmed up intake liquid will rise to the top of the chamber. |
| 722 | Pump and pipeline to transport discharged brine liquid. | |
| 724 | Pump and pipeline for intake original liquid. | |
| 726 | Pump and pipeline to extract distilled liquid. | Discharged brine liquid temperature is near ambient temperature. |
| 728 | Heat exchanger containing distilled liquid. | |
| 730 | Pump to extract distilled liquid. | |
| 732 | Combiner to combine distilled liquid from current stage collection pan and distilled liquid from previous stages. | |
| 734 | Heat exchanger containing distilled liquid. | Distilled liquid from previous stage has higher temperature than current stage's brine liquid temperature. Therefore, it can be used to heat and vaporize additional vapor. |
| 736 | Demister to filter brine liquid droplet. | |
| 738 | Brine liquid. | At each stage its temperature is at stage's boiling temperature. |
| 740 | Pipeline and pump for transferring of distilled liquid between stages. | Pump omitted in drawing to aid clarity. |
| 742 | Pipeline and pump for transferring of brine liquid between stages. | Pump omitted in drawing to aid clarity. |
| 744 | Pipeline and pump for external heating medium entering heat exchanger. | Heating medium can be heat transfer medium or vapor. Pump omitted in drawing to aid clarity. |
| 746 | Pipeline and pump for external heating medium returning to external heating source. | Heating medium can be heat transfer medium or vapor. Pump omitted in drawing to aid clarity. |
| 748 | Pipeline and nozzle to distribute intake liquid from condenser. | Dispenser omitted in drawing to aid clarity. Intake brine liquid has been heated to near boiling temperature when entering the first stage. |

Figure 8:
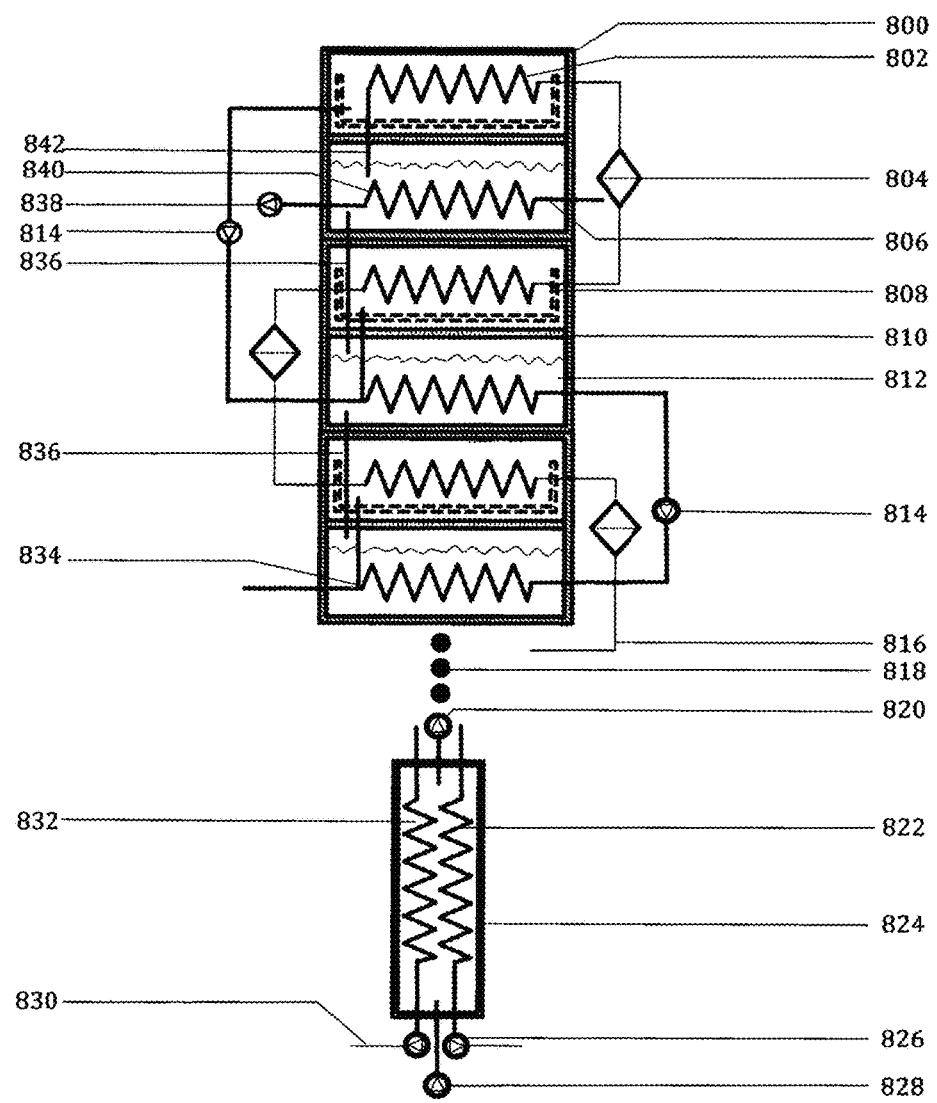
FIG. 8 illustrates another embodiment of the apparatus in a vertically stacked multi-stage configuration. It operates similarly as in FIG. 7 horizontally connected configuration. Pressure and temperature controls are not shown for clarity purpose.

FIG. 8 illustrates another embodiment of the apparatus in vertically stacked multi-stage configuration. Pipelines and pumps can be either internal to the stacks or on the exterior of the chamber walls. It operates similarly to the embodiment illustrated in FIG. 7.

TABLE 9

Multi-stage vertically "stacked" embodiment numerals and parts descriptions

| Numeral | Description | Notes |
|---|---|---|
| 800 | Apparatus exterior walls and insulating layers. | Insulation can be passive or actively heated insulation by either solar or conventional heating. |

TABLE 9-continued

Multi-stage vertically "stacked" embodiment numerals and parts descriptions

| Numeral | Description | Notes |
|---|---|---|
| 802 | Condenser. | Heated intake brine liquid is distributed to the first stage when it is near boiling temperature (842). |
| 804 | Continuous filtration devices | To continuously remove particular materials and dissolved mineral contents. |
| 806 | Heat transfer medium input into vaporization device. | Heat transfer medium can be indirect heating using heat transfer medium or direct vapor heating. |
| 808 | Distilled liquid collection pan. | In desalination distilled liquid is freshwater. |
| 810 | Demister. | To filter out brine liquid droplets formed during vaporization. |
| 812 | Brine liquid. | Its temperature is at stage's thermal equilibrium temperature. |
| 814 | Pipelines and pumps to extract and transport distilled liquid. | Distilled liquid is used in each intermediate stage to further heat the brine liquid until its temperature is near ambient environment temperature near exit outlet. |
| 816 | Additional filtration devices can be connected to additional intermediate stages. | |
| 818 | Additional intermediate stages can be connected to add more stages at pre-determined operating parameters. | |
| 820 | Pipeline and pump to transport intake liquid to next stage condenser. | Intake brine liquid is pre-heated from ambient temperature by to be discharged brine liquid and distilled liquid. |
| 822 | Heat exchanger for brine liquid. | |
| 824 | Last Pre-heater stage walls and insulating layer. | |
| 826 | Pump to transport brine liquid to discharge. | Discharged brine liquid temperature will be near ambient temperature when exiting the last stage. |
| 828 | Pipeline and pump to transport intake liquid into the last pre-heater stage. | |
| 830 | Pipeline and pump to transport distilled liquid pre-heater stage. | |
| 832 | Heat exchanger for distilled liquid. Pipeline and pump (830) will transport distilled liquid to the last pre-heater stage. | |
| 834 | Combiner, pipeline, and pump to combine and transport distilled liquid. | |
| 836 | Pipeline, pump, & brine liquid spray nozzle to distribute brine liquid to the next intermediate stage. | Details of pump and spray nozzle are not shown for clarify. |
| 838 | Heat transfer medium return (output) pipeline and pump. | |
| 840 | Vaporization device to generate distilled liquid vapor. | Vaporization device is heated by externally heated heat transfer medium. |
| 842 | Pipeline, pump, and spray nozzle to distribute intake brine liquid from condenser in the first stage. | Intake brine liquid, after being used as coolant at different stages' condensers, its temperature will be near boiling temperature when exit the condenser. |

Figure 9:
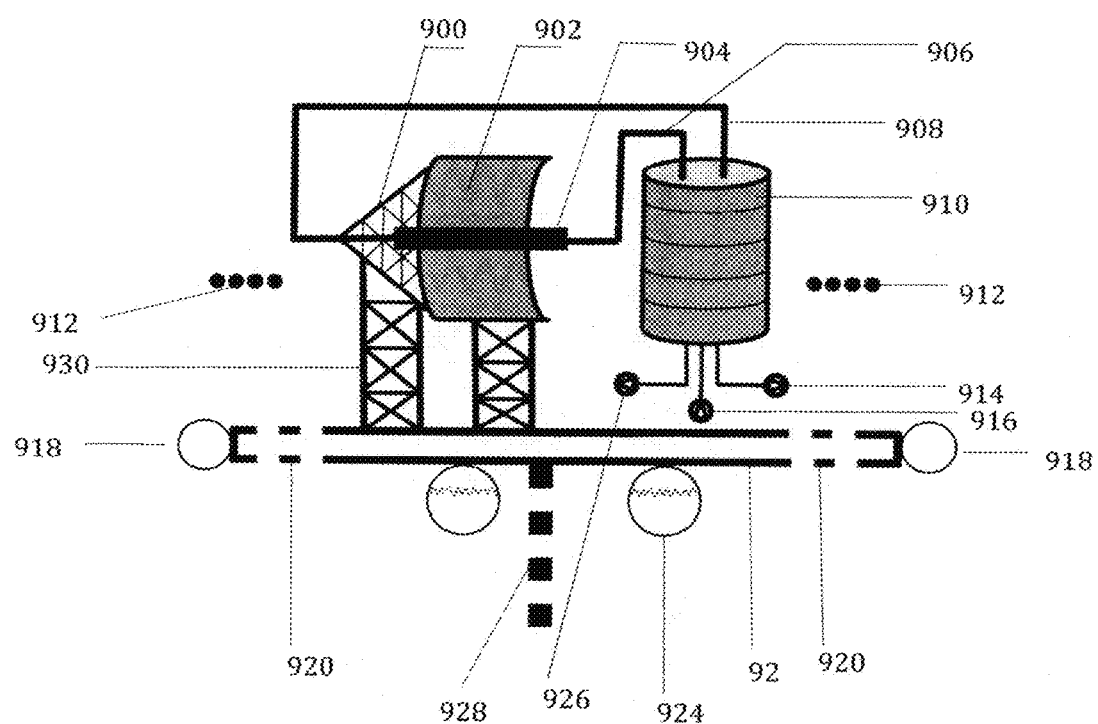
FIG. 9 illustrates one embodiment of the apparatus configuration and application in floating solar thermal desalination configuration. Anchor of the platform to sea floor is not shown for clarify purpose.

FIG. 9 illustrates one embodiment of using Concentrated Solar Panel (CSP) to heat saltwater to generate distilled freshwater. The unit is mounted on a floating platform that can be deployed directly on water surface.

Solar energy is concentrated by Concentrating Solar Panel (CSP). One embodiment of using parabolic reflective panel is used as example. Heated heat transfer medium is pumped into the apparatus as heat source. It will vaporize saltwater and produce freshwater. Floatation devices can be attached to the system to provide buoyancy at water surface. The platform can also be constructed to provide buoyancy. CSP and the apparatus are secured on rigid structure to the platform. The floating platform can also track intraday sun movement through motorized propelling devices attached to the platform on opposite sides.

TABLE 10

Concentrated Solar Panel (CSP) desalination embodiment numerals and parts descriptions

| Numeral | Description | Notes |
|---|---|---|
| 900 | Supporting and solar tracking structure for CSP. | Solar tracking structure and mechanism are not shown in the illustration for clarity purpose. |
| 902 | Concentrated Solar Panel (CSP). | CSP can be parabolic or flat Fresnel types CSP panel. |
| 904 | Evacuated solar tube to collect solar energy. | Solar heat is concentrated and used to heat transfer medium in the evacuated tube. |
| 906 | Pipeline and pump to transfer heated heat transfer medium into the apparatus to generate distilled vapor and liquid. | Pump and pipeline details are not shown. |
| 908 | Return pipeline and pump to transfer heat transfer medium back to evacuated solar tube. | |
| 910 | Apparatus to generate distilled vapor and liquid, or concentrated liquid. | |
| 912 | Multiple CSP can be connected to form a larger system. | |
| 914 | Pipeline and pump to transfer distilled liquid. | Distilled liquid is at near ambient temperature after transferring remaining excessive heat above ambient thermal energy level back to intake liquid. |
| 916 | Pipeline and pump to supply intake liquid | |
| 918 | Floatation devices and motorized propelling devices attached to the platform to provide buoyancy. | Discharged brine liquid is at near ambient temperature. Motorized propellers can be added to rotate the platform in order to track sun trajectory throughout the day. |
| 920 | Floating platforms can be extended to accommodate multiple units. | |
| 922 | Platform to provide structure support for all the CSP, apparatus, pipeline, pumps, and other devices. | Itself can serve as floatation or liquid storage device. |
| 924 | Storage tanks to hold distilled liquid. | Storage tank can also provide additional buoyancy to the platform. |
| 926 | Pipeline and pump to discharge brine liquid. | Discharged brine liquid is at near ambient temperature. |
| 928 | Anchor to hold platform and structure in position. | In floating installation the platform can be rotated. |
| 930 | Supporting structure for CSP. | |

Figure 10:
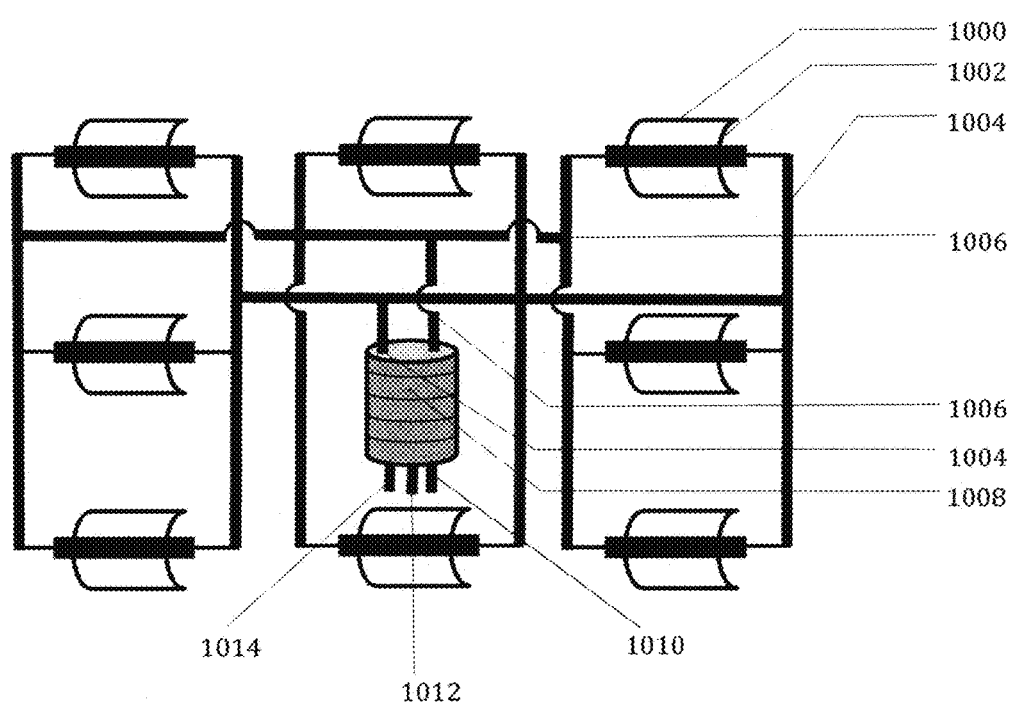
FIG. 10 illustrates another embodiment of the apparatus in a distributed, networked configuration for solar thermal desalination.

FIG. 10 illustrates one embodiment of using multiple CSP panels to desalinate saltwater. CSP panels are connected to provide concentrated heat transfer medium to heat and vaporize salt water in an apparatus. The number of CSP panels is flexible. It can be as large as a CSP field in centralized desalination plant. Or it can be assembled into sub unit to provide distributed, but networked desalination system.

Multiple CSPs can be combined to form a sub-system. Heated heat transfer medium from each unit is combined and then pumped into the apparatus to produce freshwater from saltwater. It can also be used for other liquid processing using solar energy.

TABLE 11

Distributed solar desalination system numerals and parts descriptions

| Numeral | Description | Notes |
|---|---|---|
| 1000 | Concentrated Solar Panel (CSP). | |
| 1002 | Evacuated solar tube to heat heat transfer medium. | |
| 1004 | Pipeline and pumps to collect and transport heated heat transfer medium. | Details and pumps are not shown for clarity purpose. |
| 1006 | Pipeline and pumps for return and re-distribute of heat transfer medium from the apparatus. | Details and pumps are not shown for clarity purpose. |
| 1008 | Apparatus to generate distilled liquid or concentrated liquid. | |

TABLE 11-continued

Distributed solar desalination system numerals and parts descriptions

| Numeral | Description | Notes |
|---|---|---|
| 1010 | Pipeline and pump to extract distilled liquid. | In desalination embodiment distilled liquid is freshwater. Details and pumps are not shown for clarity purpose. |
| 1012 | Pipeline and pump to supply intake liquid. | In desalination embodiment intake liquid is saltwater. Details and pumps are not shown for clarity purpose. |
| 1014 | Pipeline and pump to discharge brine liquid. | Discharged brine liquid will be at near ambient temperature. Details and pumps are not shown for clarity purpose. |

Figure 11:
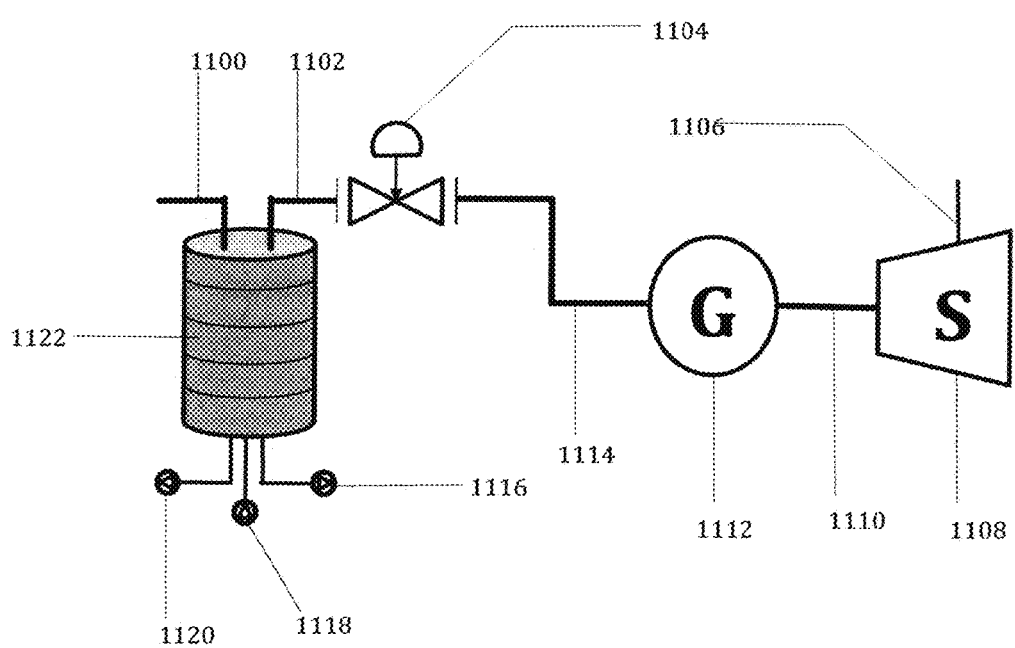
FIG. 11 illustrates another embodiment of the apparatus utilizing waste heat from power plant or other industrial systems.

FIG. 11 illustrates one embodiment of using waste heat discharged from industrial plant to power the apparatus to generate distilled liquid.

Waste heat is used to heat and vaporize brine liquid or saltwater to generate distilled liquid or freshwater respectively.

TABLE 12

Desalination system using waste vapor numerals and parts descriptions

| Numeral | Description | Notes |
|---|---|---|
| 1100 | Pipeline and pump to extract condensed distilled waste vapor liquid for further processing. | Generally, liquid condensed from waste vapor from power plant should be separated from the distilled liquid produced by the apparatus. Pump is not shown for clarity purpose. |
| 1102 | Pipeline to supply vapor from discharged waste vapor from industrial plant. | |
| 1104 | Regulator to control the pressure and flow rate of waste vapor. | |
| 1106 | Water supply to steam generator (1108). | |
| 1108 | Steam generator. | |
| 1110 | High pressure steam to drive generator. | |
| 1112 | Power generator or other industrial equipment. | |
| 1114 | Waste steam (vapor) pipeline and pump. | |
| 1116 | Distilled liquid output pipeline and pump for consumption. | |
| 1118 | Intake liquid input pipeline and pump. | Intake liquid will be at ambient temperature. |
| 1120 | Pipeline and pump to transport to-be-discharged brine liquid. | |
| 1122 | The apparatus to generate distilled liquid or concentrate liquid. | |

CONCLUSION, RAMIFICATIONS, AND SCOPE

As demonstrated in this disclosure, the apparatus and methods can be used broadly in many different types of applications, including solar thermal desalination. It is based on solid physical principles. It can significantly increase energy use efficiency and production yield. With retrofitting, systems and applications in use today can be upgraded to drastically improve its energy use efficiency and production yield, including many currently deployed thermal desalination plants based on MED and MSF.

In summary, the said apparatus and methods can provide many significant advantages over current best available technologies to desalinate, distill, disinfect, purify, or concentrate liquid:

1) It can significantly increase energy use efficiency and production yield in liquid processing. In current MED or MSF systems, thermal energy re-use is limited. With continuous re-use and accumulation of thermal energy, their efficiency can increase significantly. Production yield using the same amount of thermal energy will also be significantly increased.
2) It can use renewable energy source such as solar energy or low grade waste heat to power liquid processing.
3) When combined with concentrated solar energy, it can provide virtually unlimited supply of freshwater worldwide at high production yield. Because of high production yield, and low cost construction, maintenance, and operation, it can provide unlimited amount of freshwater at highly competitive price to current municipal water supply.
4) When combined with solar energy, it is very environmentally friendly and sustainable. It does not release harmful chemicals to the environment. Disturbance to the environment is minimal. In solar desalination released brine water is near ambient temperature. Released brine water is broadly distributed to large areas. Its intake of saltwater is small "sip". Its released brine water just has slightly more salt concentration than ambient saltwater. Released brine water temperature is near ambient temperature.

5) Its construction and deployment is simple and reliable.
6) It offers option to install and deploy in different locations, even include direct water surface installation. With water surface installation, it can be deployed in less intrusive or environmentally impactful locations. Because of its modular, distributed design, units can be installed at different types of locations to meet local requirement.
7) With solar energy as thermal energy source, it can operate "off-grid" in remote and un-developed locations. There is minimal dependency or pre-requirement to infrastructure such as electrical grid.
8) With boiling of water to generate freshwater vapor, freshwater produced is already sanitized. It can be directly consumed, if the system and pipelines are properly maintained.
9) Because of the simple design and construction, the system is high reliable and robust. Materials used can be long lasting. In turn it will significantly reduce long term operation and maintenance cost.
10) Its modular, distributed, networked design can scale to different requirement. They can be custom tailored to local needs. As need changes, they can be scaled up or down quickly. Investment can be re-deployed.

Although the descriptions above contain many specificities, these should not be construed as limiting the scope of the embodiments but as merely providing illustrations of some of several embodiments. For example, the apparatus could be designed and constructed using different configurations in addition to illustrated horizontally connected or vertically stacked configurations. The apparatus could be designed and constructed using widely available different materials, shapes, configurations, or techniques, not limited to the above described materials, shapes, configurations or techniques. Heat source could be of many different types and generated through different means, in addition to solar energy or waste heat. Liquid to be processed could be of many different types and for different applications, not just limited to desalination, disinfection, purification, or concentration purposes. Thus the scope of the embodiments should be determined by the appended claims and their legal equivalents, rather by the examples given.

I claim:

1. A method to desalinate, distill, disinfect, purify, or concentrate original liquid, the method comprising:
   (a) providing a fluid to a direct heating and vaporization as first stage, a series of flash vaporization stages, and a pre-heater stage;
   (b) integrating condenser within each stage except the pre-heater stage;
   (c) connecting the stages through pipelines, regulators, and pumps to dynamically control stage saturation pressure and temperature and liquid, vapor and non-condensable gas flow rate;
   (d) thermally insulating each stage from ambient environment and thermally isolating each stage from each other;
   (e) integrating external heat source to heat a heat transfer medium;
   (f) integrating a heat exchanger in the first stage to directly heat and vaporize original liquid, wherein the heat transfer medium transfers heat to the original liquid in the stage via the heat exchanger;
   (g) directing the outflow of original liquid from the first direct heating stage in (f) to a series of connected flash vaporization and condensation stages, wherein each stage saturation pressure and temperature are dynamically controlled at progressively lower level towards pre-heater stage;
   (h) directing the outflow from the last of the series of flash vaporization stages to the pre-heater stage and mixed it with fresh intake original liquid;
   (i) directing mixed liquid in (h) to the last flash vaporization stage condenser in opposite direction from the original liquid;
   (j) using the mixed liquid in (i) as coolant for condensers;
   (k) connecting and regulating coolant flow rate through the series of condensers to condense distilled liquid in each stage; (l) returning coolant from the condenser in the first direct heating and vaporization stage to the stage, wherein coolant is re-used and mixed with original liquid;
   (m) collecting and transporting condensed distilled liquid from each stage by pumps;
   (n) removing non-condensable gas from each stage by pumps;
   (o) installing a demister to separate collected distilled liquid from original liquid in each stage.

2. The method in claim 1, wherein thermal insulation for each stage and thermal isolation between stages are achieved by (a) constructing stage exterior walls using low thermal conductivity materials;
   (b) shielding the stage exterior walk with thermal insulating materials;
   (c) applying solar energy absorbing coating to the stage exterior walls;
   (d) shielding the stage by adding extra thermal vacuum chamber enclosing the stage; or
   (e) heating of the exterior walls of the stage by adding heating element.

3. The method in claim 1, wherein the first stage generates distilled vapor by circulating externally heated heat transfer medium through the heat exchanger in the stage.

4. The method in claim 1, wherein each flash vaporization stage is operated at controlled saturation pressure and temperature.

5. The method in claim 4, wherein the series of flash vaporization stages' saturation pressures and temperatures are dynamically controlled at progressively lower level to enable flash vaporization.

6. The method in claim 4, wherein the distilled vapor is generated by the super-heated original liquid entering flash vaporization stage with lower saturation pressure and temperature.

7. The method in claim 6, wherein the original liquid entering the stage has higher temperature than the stage saturation temperature.

8. The method in claim 1, wherein the original liquid from the last stage of the series of flash vaporization stages is re-used and fed into condenser as coolant.

9. The method in claim 8, wherein the coolant entering condenser in each flash vaporization stage has temperature lower than the stage saturation temperature to enable condensation of distilled vapor in the stage.

10. The method in claim 1, wherein the condenser thermal exchange efficiency is enhanced by:

(a) increasing condenser thermal exchange surface area;
(b) applying hydrophobic coating to condenser exterior surface;
(c) implementing high efficiency condenser surface geometries; or
(d) using high thermal conducting materials to construct condenser.

11. The method in claim 1, wherein condensed distilled liquid is collected by a collector.

12. The method in claim 1, wherein the collected distilled liquid is transported away from stage by pumps.

13. The method in claim 1, further comprising continuously removing of organic, particular, and dissolved mineral content in original liquid between stages by means of filtration.

14. The method in claim 1, further comprising mixing of original liquid from the last flashing vaporization with fresh intake original liquid.

15. The method of claim 1, wherein the heat for heating the heat transfer medium used in heating the evaporator stage is provided by:
(a) using heat from a concentrated solar power collector;
(b) using industrial waste heat;
(c) using fossil fuel to heat the heat transfer medium; or
(d) using an electrical heater.

16. The method in claim 15, wherein Concentrated Solar Power collector sun tracking is provided by selecting from the group of methods consisting of:
(a) using motorized propellers attached to opposite side of the system rotating the system floating at water surface; and
(b) using motorized collector panel following sun inter-day and intra-day positions.

17. The method in claim 1, wherein the system is installed
(a) with a collector array on land;
(b) on a floating the system at water surface by means of attaching flotation devices, or using the system's pipelines and stages in the apparatus as flotation devices;
(c) on ship vessel; or
(d) on mobile vehicle.

* * * * *